United States Patent [19]

Kussel et al.

[11] Patent Number: 4,716,928
[45] Date of Patent: Jan. 5, 1988

[54] PRESSURE-RELIEF VALVE DEVICES

[75] Inventors: Willy Kussel, Werne; Walter Weirich, Dortmund, both of Fed. Rep. of Germany

[73] Assignee: Gewerkschaft Eisenhutte Westfalia GmbH, Lunen, Fed. Rep. of Germany

[21] Appl. No.: 877,584

[22] Filed: Jun. 23, 1986

[30] Foreign Application Priority Data

Jul. 2, 1985 [DE] Fed. Rep. of Germany ....... 3523548

[51] Int. Cl.$^4$ .................. F16K 15/06; F16K 17/04
[52] U.S. Cl. ..................................... 137/494; 137/538
[58] Field of Search ................................ 137/494, 538

[56] References Cited

U.S. PATENT DOCUMENTS

| | | | |
|---|---|---|---|
| 2,287,840 | 6/1942 | Stratton | 137/538 X |
| 3,482,415 | 12/1969 | Trask | 137/538 X |
| 3,482,594 | 12/1969 | Simon | 137/538 |
| 3,548,867 | 12/1970 | Grisebach et al. | 137/494 |
| 4,274,435 | 6/1981 | Block | 137/538 X |
| 4,284,101 | 8/1981 | Weirich | 137/494 X |
| 4,313,463 | 2/1982 | Weirich | 137/494 X |
| 4,552,172 | 11/1985 | Krieger et al. | 137/494 X |

Primary Examiner—Martin P. Schwadron
Attorney, Agent, or Firm—Sughraue, Mion, Zinn, Macpeak and Seas

[57] ABSTRACT

A pressure-relief hydraulic valve device for mining equipment is composed of a hollow sleeve mounting a guide with a through bore slidably receiving the stem of a valve member. The stem is provided with a blind axial bore leading to a set of radial bores and a seal in the bore of the guide co-operates with the radial bores to form a valve. A spring accommodated in the sleeve acts through a shaped pressure member to urge the valve member to a position with the valve closed. Pressure fluid in equipment to be protected acts on the valve member and excess pressure displaces the valve member against the spring force to open the valve and permit the escape of fluid via an outflow chamber and outlets in the sleeve. The pressure member has a piston like flange guided within the sleeve against which the spring bears and the underside of the flange of the pressure member is shaped to provide a concave guide face in the outflow chamber.

4 Claims, 1 Drawing Figure

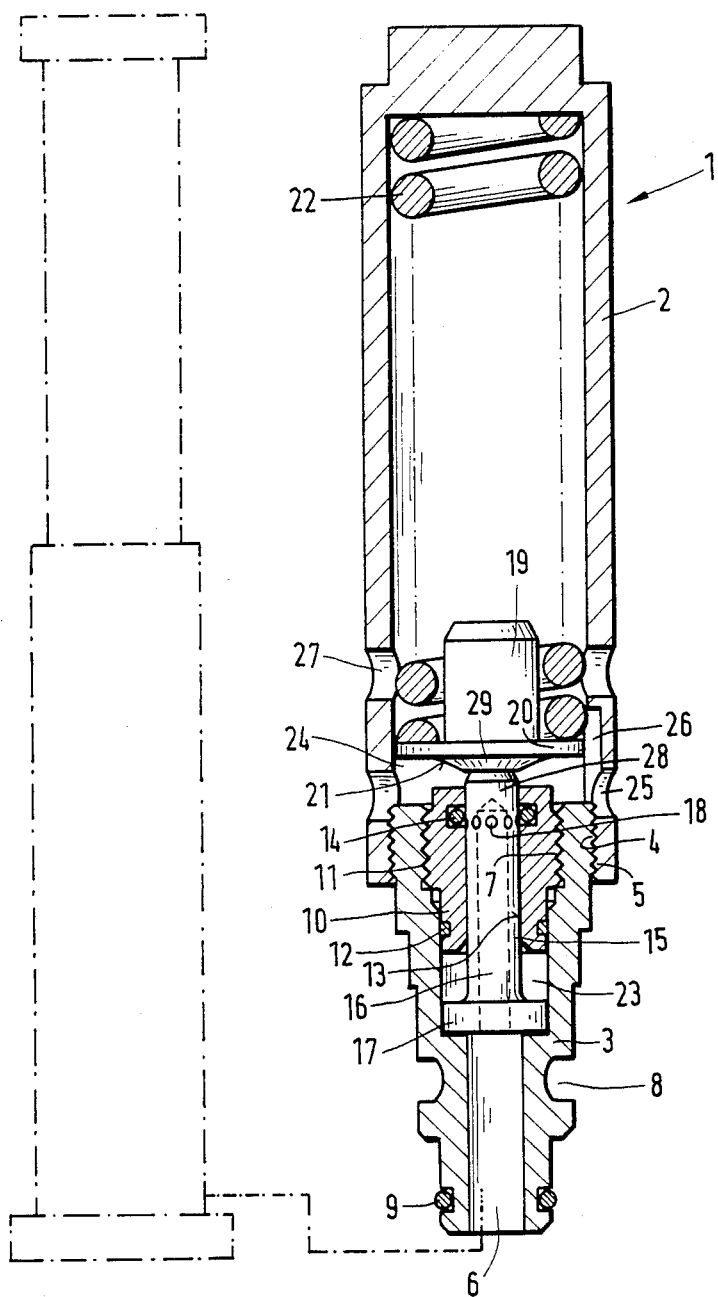

PRESSURE-RELIEF VALVE DEVICES

FIELD OF THE INVENTION

The present invention relates to pressure-relief valve devices particularly for use with hydraulic mining equipment, such as a roof support or prop.

BACKGROUND TO THE INVENTION

Pressure-relief valve devices of various designs are widely used to protect mining equipment against excessive pressure and especially hydraulic props which are exposed to high forces by the roof of a mine working. Known devices are of small compact design and are coupled to the equipment to connect to a working chamber thereof so as to be exposed to the pressure fluid therein. Normally the valves of such a device remains closed but excessive pressure causes the valve to open to permit fluid to pass through the device and escape to relieve the excess pressure. Known types of devices are described in U.S. Pat. Nos. 4,284,101 and 4,313,463 and in German Patent Specification No. 1,303,157.

It is desirable that when the valve of the device opens and fluid flows through the device the quantity of through flow per unit of time (Q) is such that the pressure of the fluid should not rise ($\Delta P$) more than 20% above the setting pressure of the valve (P) and that the opening pressure rise should be kept as low as possible. In addition, the closing pressure should be as close as possible to the opening pressure to provide a good response. Those requirements are in contradistinction to one another and it has been found that the characteristics of the compression spring which holds the piston or valve member in a closed position are decisive in determining the overall response of the valve device. A hard spring imposes a short stroke or displacement on the valve member and produces a short closure time and a high closure force. A sudden pressure rise however only creates a slight increase in the quantity of through flow (Q) and an undesired pressure rise ($\Delta P$) occurs. A soft spring on the other hand allows a longer stroke of the valve member and a progressive increase in the through flow quantity to minimize the pressure rise. However, this is offset by a low closure force which can cause fluttering or oscillations with increased wear and locking and damage can occur to the spring.

In the known devices the spring abuts on a dish-like piston or pressure piece which transfers force to the valve member itself. When the valve opens fluid passes at high pressure and speed from radial bores in a stem of the valve member and into an annular chamber beneath the pressure piece which leads via outflow to the exterior. The pressure fluid impinges on the plain annular surface at the underside of the pressure piece and creates wear.

A general object of the present invention is to provide an improved form of valve device. Another object is to provide a valve device wherein the opening and closing pressures are close to one another, yet the pressure rise ($\Delta P$) during through flow is minimised. A further object is to provide a valve device which has a long service life.

SUMMARY OF THE INVENTION

A valve device constructed in accordance with the invention comprises a hollow sleeve providing a main housing closed at one end and open at the other end, pressure fluid outlet means leading from the housing; a guide having an axial bore; means for locating the guide to the other open end of the housing; a valve member having a stem slidably received in the axial bore of the guide, an axial bore in the stem which is open to form fluid inlet means remote from the housing, radial bores leading to the periphery of the stem which communicate with the axial bore therein; sealing means between the periphery of the stem and the axial bore which co-operates with the radial bores to establish therewith a valve between the inlet and outlet means; and a spring located in the housing to apply force to the valve member to maintain the valve closed unless the pressure acting on the valve member rises above a pre-determined value whereupon the valve member is displaced to open the valve. In accordance with the invention, a dish-like pressure member abuts the valve member to transmit the closure force of the spring to the valve member. The pressure member has a flange with a peripheral surface guided by the inner surface of the housing. The spring engages on one face of the flange. The pressure member has a frustoconical portion adjacent the valve member opposite said one face and which forms a concave face merging with the flange.

The concave face permits the use of a hard spring but without the disadvantages normally encountered as mentioned hereinbefore.

Conveniently, the means for locating the guide is a hollow connector part in screw-threaded external engagement with the housing, the connector part being in screw-threaded internal engagement with the guide.

By screwing the connector part in one direction or the other relative to the housing or sleeve the setting pressure at which the valve opens can be varied, as is known per se. When the setting or threshold pressure is exceeded the valve member slides in the guide bore towards the housing compressing the spring to cause the radial bores to move passed the sealing means to thereby open the valve. Pressure fluid then discharges through the radial bores into an outflow chamber bounded at least in part by the guide, the shaped underside of the pressure member and the inside wall of the sleeve or housing. This chamber is open to the outlet means which can take the form of bores in the housing wall. The outlet means, e.g. bores, can lead to the surrounding atmosphere or back to a pressure fluid return line. The dimensions of the radial bores in the valve member stem and the outlet bores in the housing are selected so that a pressure of around 10–20 bar builds up in the chamber. These pressure act on the concave face to produce an additional force on the spring. The concave face also forms a guide surface which deflects the pressure fluid entering the outflow chamber to the outlet bores thereby avoiding erosion. Preferably sets of bores in the housing are supplemented by a longitudinal goove in the inner wall to control the pressure in the outflow chamber. The connector part preferably has a stepped internal bore and the valve member has a piston at the open end of the stem which is guided by part of the stepped bore. The longitudinal displacement of the valve member can then be limited by engagement of the piston on a shoulder of the stepped bore under the action of the spring and by an end face of the guide remote from the spring under the action of the pressure of the pressure fluid at the inlet means. An annular space is created between the piston of the valve member and underside of the guide which is normally filled with pressure fluid. When the valve member is displaced towards the spring the pressure fluid is forced out of the space and dampens the displacement to prevent fluttering which can otherwise lead to destruction of the valve device.

The invention may be understood more readily and various other aspects and features of the invention may become apparent from consideration of the following description.

BRIEF DESCRIPTION OF THE DRAWING

An embodiment of the invention will not be described, by way of example only, with reference to the accompanying drawing, the FIGURE which is a sectional elevation of a pressure-relief valve device constructed in accordance with the invention.

DESCRIPTION OF PREFERRED EMBODIMENT

As shown in the drawing, a device 1 constructed in accordance with the invention is of cartridge-like configuration and has a first component part 2 in the form of a hollow sleeve forming a housing. A second component part 3 in the form of a connector is fitted partly inside the open end of the sleeve 2 by way of an external screw-thread 4 engaged with an internal screw-thread 5 in the sleeve 2. The part 3 can be screwed into the sleeve 2 to various locations or unscrewed and detached therefrom. The sleeve 2 has an upper end wall opposite the open end which closes off the interior bore therein and in the vicinity of the screw-thread 5 the sleeve 2 has two sets of radial bores 25, 27. The inner wall of the sleeve 2 is relieved with a longitudinal groove 26 adjoining one of the bores 25.

The lower end of the connector 3 is adapted to form a push-in connector with some associated equipment, say an hydraulic roof support or prop thereof, and to establish communication for the flow of hydraulic pressure fluid to the device. As shown, the connector part 3 has a groove 8 which receives a coupling clip (not shown) used to detachably secure the device to the equipment. An O-ring seal 9 located in a further groove in the connector part serves to establish sealing between the device and the equipment in respect of the hydraulic pressure fluid.

The component part 3 has a stepped internal bore 6 which receives a third component in the form of a guide bush 10 having an axial guide bore 13. The guide bush 10 has an external screw-thread 11 which mates with an internal screw-thread 7 in the upper region of the bore 6 nearest the sleeve 2. The guide bush 10 has an O-ring seal 12 in an external groove which seals with the bore 6 inwardly from the screw-threads 7, 11.

A fourth component part in the form of a valve member 15 is received for sliding within the bore 13 of the bush 10. An O-ring seal 14 is provided in a groove in the bore 13 and seals against the peripheral surface of a stem of the valve member 15. The valve member 15 is provided with a blind axial bore 16 open at the lower end where a piston 17 is located. This bore 16 communicates with a plurality of radial bores 18 near the upper end of the stem.

A fifth component part in the form of a piston-like pressure member 19 is located in the sleeve 2 to engage on the end surface of the upper end 28 of the stem of the piston member 15. A sixth component part in the form of a compression spring 22 is located within the sleeve 2 and bears on the upper end wall of the sleeve 2 and on an annular flange 20 of the pressure member 19. The annular flange 20 is slidably guided with slight play by the inner wall surface of the sleeve 2. At the lower side of the flange 20 there is a frusto-conical portion 29 with a central region engaging the upper end surface of the stem of the piston member 15. The circumferential surface of the portion 29 and the under side of the flange 20 merg smoothly to form a concave guide surface 21. This shaped surface 21 and the upper faces of the guide bush 10 and the connector part 3 define an outflow chamber 24 with the inner wall of the sleeve 2. An annular space 23 is located between the piston 17 and the underside of the guide 10.

During operation, the spring 22 urges the pressure member 19 downwardly to hold the valve member 15 in a position with its bores 18 sealed by the seal 14. This thereby closes the valve constituted by the bores 18 and the seal 14. Conveniently, the piston 17 can locate on a shoulder of the stepped bore 6 to define this valve position. The lower working face of the piston 17, inter alia, is exposed to the pressure of the fluid in the ancilliary equipment and a rise in the pressure above a pre-determined threshold will cause the valve member 15 to be lifted urging the pressure member 19 upwardly to compress the spring 22 and bring the bores 18 above the seal 14 to permit pressure fluid to pass through the bores 16, 18 into the chamber 24 and hence to escape via the bores 25, or 25,27. The through flow of fluid per unit time (Q) gives rise to an increase in pressure ($\Delta P$). The relief pressure caused by the escape of fluid can permit the spring 22 to restore the valve member 15 to close the valve constituted by the bores 18 and the seal 14. The pressure at which the valve 14, 18 opens can be varied by adjusting the relative positions of the sleeve 2 and the connector part 3 with the inter-engaging screw-threads 4, 5. Fluid is normally present in the space 23 above the piston 17 due to leakage past the piston 17 and this tends to dampen the movement of the valve member 15 and avoids fluttering.

The cross-section of the bores 25, 27 and the bores 18 are chosen to optimize the through flow (Q).

The device as described and illustrated provides a relatively flat characteristic curve ($\Delta P/Q$) as is desired when open, and has a closing pressure near to the opening or threshold pressure.

The guide face 21 serves to transmit pressure from the chamber 24 to the pressure member 19 and hence to the spring 22 in a controlled manner. This additional force provides a smooth soft response and prevents undue pressure fluctuations. Moreover fluid entering the chamber 24 is guided by the face 21 towards the outflow bores 25, 27 and this avoids erosion of the pressure member 19 and the spring 21.

We claim

1. A valve device for pressure relief of hydraulic ressure fluid used with mining equipment, said device comprising:
    (a) a hollow sleeve (2) providing a main housing closed at one end and open at another, opposite end,
    (b) pressure fluid outlet means (25, 27) leading from the interior of the housing,
    (c) a guide (10) having an axial through bore (13),
    (d) a valve member (15) having a cylindrical stem slidably received in the axial bore in the guide, an abutment face at an upper end of the stem having an area substantially similar to the cross-sectional area of the stem, an enlarged portion forming a piston (17) at the lower end of the valve member, an axial blind bore (16) in the stem which is open at the lower end of the valve member remote from the abutment face to form pressure fluid inlet means, and radial bores (18) leading to the periphery of the stem and communicating with the axial bore therein, (e) sealing means (14) disposed between the periphery of the stem of the valve member and the axial bore in the guide, said sealing means cooperating with the radial bores to establish therewith a valve between the fluid inlet and outlet means.

(f) a hollow connector part (3) with a stepped internal bore, said connector part being in screw-threaded engagement (4, 5) with the housing and with the guide to locate the guide within the open end of the housing in an axially adjustable manner, the connector part being provided with means (8, 9) for mounting the device to other equipment and providing a pressure fluid flow path between such equipment and the inlet means, (g) stop means formed by the stepped bore in the connector part which cooperates with the piston of the valve member to define a closed position for the valve, (h) a pressure member (19) located in the housing, the pressure member having a flange (20) with a peripheral surface in guiding relation to an internal surface of the housing, a frustoconical projecting portion (29) with a central region forming a further abutment face which engages on the abutment face of the stem of the valve member, and a concave face (21) merging the abutment face with the flange, and (i) a spring (22) located in the housing to apply force to the flange of the pressure member to urge the abutment faces of the pressure member and the stem together to bias the valve member against the stop means to maintain the valve closed unless the pressure acting on the valve member via the inlet means rises above a predetermined value, whereupon the valve member is displaced to compress the spring and open the valve to permit pressure relief via the outlet means of the housing with the pressure fluid being progressively guided to the outlet means by the concave face of the pressure member.

2. A valve device according to claim 1, wherein sealing means (12) is provided between the exterior of the guide and the interior of the connector part.

3. A valve device according to claim 1, wherein the fluid outlet means takes the form of sets of radial bores in the housing.

4. A valve device according to claim 1, wherein longitudinal displacement of the valve member against the spring force is delimited by engagement of the piston of the valve member on an end face of the guide remote from the spring.

* * * * *